Nov. 26, 1935.  O. E. DENIVELLE ET AL  2,022,107
CONTROLLABLE VOICE
Filed March 20, 1935
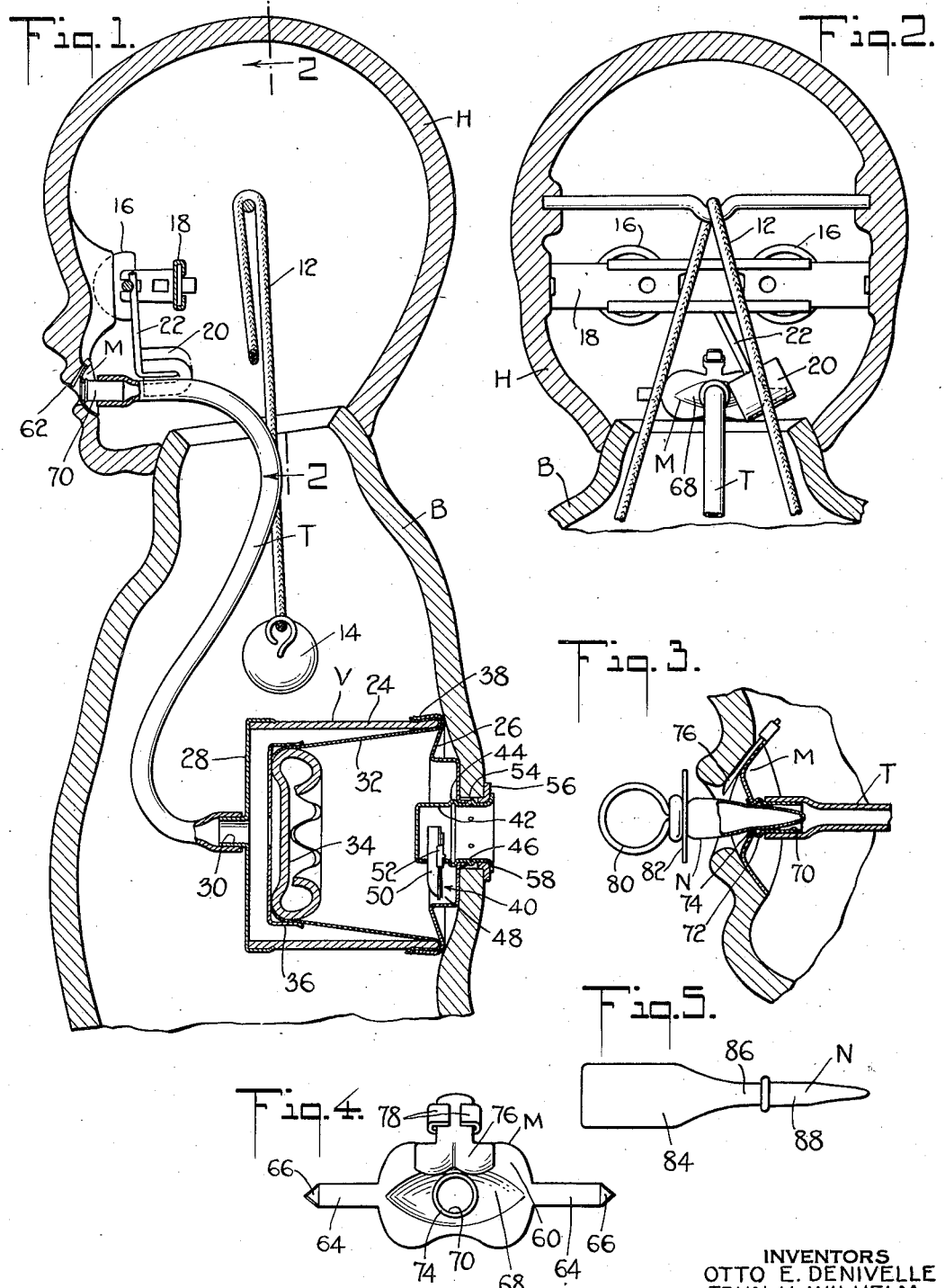
INVENTORS
OTTO E. DENIVELLE
JOHN H. WILHELM
BY
James + Franklin
ATTORNEYS Patented Nov. 26, 1935

2,022,107

UNITED STATES PATENT OFFICE 2,022,107

CONTROLLABLE VOICE

Otto E. Denivelle, Mount Vernon, and John H. Wilhelm, Hamilton Beach, N. Y., assignors to Voices, Incorporated, New York, N. Y., a corporation of Delaware Application March 20, 1935, Serial No. 11,912

23 Claims. (Cl. 46—178)

This invention relates to voices for toys, and more particularly to a controllable voice for dolls.

Voices or criers have been developed for use in toys, particularly dolls. The most popular and successful type is that operated gravitationally, as by means of a flexible bellows moved by a weighty head to displace air through a reed or sound producing means. The primary and general object of our invention is to improve such a voice by the addition of control means for readily making the same operative or inoperative at will. A more particular object is to devise such a means which will make possible control of the voice remotely or at a distance from the voice.

A still more particular object of our invention centers about the use of such a controllable voice in a doll, and is to locate the control means at the mouth of the doll and to so arrange the same that the desired control will be effected by inserting into the mouth a nipple. With this arrangement the doll voice, which normally is in operative or crying condition, may be made inoperative by placing a simulated baby bottle with a nipple at the end thereof in the mouth of the doll, the effect being, of course, as though the doll has been quieted by receiving its bottle.

Other objects of our invention are to devise a controllable voice mechanism as aforesaid, which will be simple and inexpensive in construction; fool-proof in operation; and which will employ a voice which is substantially of standard or conventional construction.

To the accomplishment of the foregoing and other objects which will hereinafter appear, our invention consists in the doll voice and control elements and their relation one to the other, as are hereinafter more particularly described in the specification and sought to be defined in the claims. The specification is accompanied by a drawing in which:

Fig. 1 is a section taken in elevation through a doll having a voice and control mechanism therefor embodying features of our invention;

Fig. 2 is a section taken in the plane of the line 2—2 in Fig. 1;

Fig. 3 is an enlarged section at the mouth, and illustrates the control mechanism for the voice;

Fig. 4 is a front elevation of a mouth set designed for use in our invention; and Fig. 5 illustrates a toy baby bottle having a nipple suitable for use as a voice control element.

Referring to the drawing, the invention comprises a doll body B having mounted therein a doll voice or crier V. The doll head H includes a mouth opening behind which is fitted a tongue and teeth or mouth set M. The voice control means is here exemplified by a flexible rubber tube T extending from the voice V to the mouth set M and adapted to be sealed by the use of an appropriate valve or stopper here exemplified by a soft rubber nipple N. The voice may be controlled in a variety of ways, but that here illustrated is believed to be most effective and simple and, as will be evident from inspection of Fig. 1, is based upon the provision of an imperforate casing for the voice when the control tube T is sealed, thus making the bellows inoperative. The use of pneumatic control means including the flexible rubber tube T is especially convenient because it not only is adapted to dolls of differing size and construction, but also affords relative movement of the head with respect to the body of the doll, all without disturbing the voice mechanism.

Considering the arrangement in greater detail, the doll body B and head H are of conventional type and may be flexible or rigid. The head is held on the body in conventional fashion, as by the use of an elastic cord 12, which cord may also serve to hold the limbs on the body, this being illustrated by the arm socket 14 shown in Fig. 1. The head may be provided with eye openings occupied by movable eyes 16 carried on a bridge or support 18 and oscillated by a gravity weight 20. The eye mechanism is conventional and needs no comment other than to point out that if, as is frequently the case, the weight 20 extends below the mouth set M, it may become necessary or desirable to place the weight support arm 22 at an angle, as is best shown in Fig. 2, thereby bringing the weight 20 at the side of tube T in order to avoid interference therebetween.

The voice V is preferably of the type disclosed and claimed in copending application of John H. Wilhelm, Serial No. 5,024, filed February 5, 1935.

The voice comprises a cylindrical casing 24 which may be made of cardboard and which is closed at one end by a sound discharge cap 26 and at the other end by a closure 28 vented at 30. Except for the vent 30, the casing is imperforate. A frustro-conical flexible bellows cloth 32 is housed within the casing and is closed at one end by a movable weighty head including a weight 34 against which the bellows cloth is clamped by a cap 36. The other end of bellows cloth 32 is secured to the sound discharge end of the casing by means of the flange 38 of cap 26. The air displaced by the bellows is forced through an appropriate sound producing means 40 mounted in the side wall of a sound discharge tube 42 which is secured to cap 26 by a bead 44 and indentations 46. Sound producing means 40 may be of standard type and comprises a vibratile reed 48 held over the open side of a channel member 50 by means of a clip 52.

The sound discharge tube 42 also serves structurally as means to mount the voice in place within the hollow doll body. For this purpose, a hole 54 is formed in the doll body, and tube 42 is passed therethrough. If desired, a washer 56 may be slid over the end of the tube, after which the outer edge is flanged outwardly, as is indicated at 58, thereby locking the voice in place. The manner in which this result may be accomplished is described in greater detail in the copending application Serial No. 5,024 previously referred to. It will also be understood that the hole 54, instead of being formed at the back of the doll body, may, if desired, be formed at the front of the doll body, as, for example, at the navel.

The mouth set M comprises a plate 60 (Fig. 4) of convex shape adapted to fit behind the mouth opening 62 of the doll head. A pair of arms 64 are formed integrally with plate 60 and are provided with spurs or tangs 66 which are embedded in the inner wall of the head by appropriate mechanism when the mouth set is applied to the head. The central portion 68 of plate 60 is depressed rearwardly to trough-like configuration and is perforated to receive a coupling tube 70. This tube may be secured to the plate 60 in any desired manner, and in the present case a bead 72 is formed inside the plate, while the outer end of the coupling tube is flanged outwardly at 74, thus locking the plate between bead 72. The mouth set may, if desired, be completed by the addition thereto of a member 76 formed from celluloid or like material and simulating teeth, this member being secured to plate 60 by lugs 78 formed integrally with the plate.

The tube T is a slender flexible rubber tube suitably dimensioned to be fitted over the vent pipe 30 and over the coupling pipe 70, as is evident in Fig. 1. The fit of the tube is, of course, preferably made snug in order to insure a tight seal.

The nipple N is preferably formed of thin flexible sheet rubber. In Fig. 3, the nipple is of a type used for teething babies and is completed by a celluloid or like ring 80 and a celluloid or like washer 82. In Fig. 5 I show a toy baby bottle formed of a white glass bottle portion 84 the neck 86 of which has slipped thereover a rubber nipple 88 which is similar to that shown in Fig. 3 in being generally conical in shape and being formed of thin sheet rubber. The advantage of using thin sheet rubber is that the nipple need be placed in the mouth opening only lightly, for upon attempted movement of the weight of the voice or collapse of the bellows, the resulting suction itself operates to expand the hollow nipple and to cause the same to fit the coupling pipe 70 with a tight seal, thus making the voice wholly inoperative.

It is believed that the mode of constructing and using, as well as the many advantages of our improved controllable doll voice system, will be apparent from the foregoing detailed description thereof. The voice is substantially similar in construction to a conventional uncontrolled voice, yet is positively and effectively controlled by exceedingly simple means which may be made operative at any desired distance from the voice.

The interconnection between the control or valve point and the voice is a flexible one, thereby affording movement of the head relative to the body of the doll. Using a sealing or stopper effect as the valve condition which makes the voice inoperative, is particularly fortunate in that the simulated crying of the doll may be stopped by the soothing effect of placing a nipple in its mouth. Furthermore, the fact that the stopper or nipple works under suction makes the same self-sealing even though the nipple is placed in the mouth lightly.

It should be understood that while we have shown and described our invention in preferred form, many changes and modifications may be made without departing from the spirit of the invention. For example, the bellows may be reversed so that the large end thereof will be secured to the casing by the vented cap instead of the sound discharge cap. Such reversed bellows arrangement is disclosed in copending application Serial No. 5,024 heretofore referred to. The operation of this modification is identical to that already described. The arrangement may be still further modified by placing the sound producing reed on the weighty movable head instead of on the sound discharge cap. In that case the vent or control tube with the sound producing air chamber and the voice is operative when the tube is sealed and inoperative when the tube is vented. In other words, the operation when using a simple stopper or nipple is opposite to that previously described. However, we have also constructed a model of this character in which the mouth set includes a valve which is physically moved and opened by insertion of a simulated nipple, but which is closed when the nipple is removed. The provision of such a valve causes the voice to be made inoperative when the nipple is applied, just as is the case with the arrangement more specifically disclosed herein. We have also constructed dolls of this character in which the control of the voice is obtained by mechanical means. However, of these various forms we have concluded that that herein disclosed is most preferable.

We claim:

1. A controllable doll voice comprising a casing, a flexible bellows therein, means to move the bellows, sound producing means responsive to air displaced by said bellows, and control means other than the bellows moving means to make the voice operative or inoperative at will.

2. A controllable doll voice comprising a casing, a flexible bellows therein, means to move the bellows, sound producing means responsive to air displaced by said bellows, and means to make the bellows moving means operative or inoperative at will.

3. A controllable doll voice comprising a casing, a weighty head movable therein, a flexible bellows having one part secured to said head for gravity actuation of said bellows, sound producing means responsive to air displaced by said bellows, and means to make the voice operative or inoperative at will, despite gravitational influence on the weighty head.

4. A controllable doll voice comprising a casing, a weighty head movable therein, a flexible bellows having one part secured to said head for gravity actuation of said bellows, sound producing means responsive to air displaced by said bellows, and means to prevent movement of the weighty head in order to make the voice operative or inoperative at will.

5. A controllable doll voice comprising a casing, a flexible bellows therein, means to move the bellows, sound producing means responsive to air displaced by said bellows, a sound discharge opening, and pneumatic control means independent of the bellows moving means for making the voice operative or inoperative at will, said means including a vent opening in the casing and means to open or close said opening.

6. A controllable doll voice assembly comprising a voice including a casing, a flexible bellows therein, means to move the bellows, and sound producing means responsive to air displaced by said bellows, and pneumatic control means for making the voice operative or inoperative at will, said means including a flexible rubber tube connected at one end to said voice, and means to open or close the other end of the tube.

7. A controllable doll voice assembly comprising a voice including a casing, a weighty head movable therein, a flexible bellows having a part secured to said head, and sound producing means responsive to air displaced by said bellows, and pneumatic control means for making the voice operative or inoperative at will, said means including a flexible rubber tube connected at one end to said voice, and means to open or close the other end of the tube.

8. A controllable doll voice assembly comprising a voice including a casing, a weighty head gravitationally movable therein, a flexible bellows having a part secured to said head, and sound producing means responsive to air displaced by said bellows, and control means for making the voice operative or inoperative at will, said means including a doll mouth set, connection means extending between the mouth set and the voice, and means at the mouth set for controlling the operability of the voice through said connection means.

9. A controllable doll voice assembly comprising a voice including a casing, a weighty head gravitationally movable therein, a flexible bellows having a part secured to said head, and sound producing means responsive to air displaced by said bellows, and pneumatic control means for making the voice operative or inoperative at will, said means including a flexible rubber tube connected at one end to said voice, a doll mouth set connected to the other end of said flexible tube, and means at said mouth set to open or close the end of the tube.

10. A controllable doll voice assembly comprising a voice including a casing, a weighty head movable therein, a flexible bellows having a part secured to said head, and sound producing means responsive to air displaced by said bellows, and pneumatic control means for making the voice operative or inoperative at will, said means including a flexible rubber tube connected at one end to said voice, a mouth set having an opening therein connected to the other end of said flexible tube, and means adapted to fit into the opening in said mouth set in order to open or close the end of the tube.

11. A controllable doll voice assembly comprising a voice including a casing, a flexible bellows therein, means to move said bellows, and sound producing means responsive to air displaced by said bellows, and control means for making the voice operative or inoperative at will, said means including a mouth set having an opening therein, connection means extending from said mouth set to said voice, and a simulated nipple dimensioned to be received in said mouth set opening and adapted to control the operability of the voice through said connection means.

12. A controllable doll voice assembly comprising a voice including a casing, a weighty head movable therein, a flexible bellows having a part secured to said head, and sound producing means responsive to air displaced by said bellows, and pneumatic control means for making the voice operative or inoperative at will, said means including a flexible rubber tube connected at one end to said voice, a mouth set having an opening therein connected to the other end of said flexible tube, and a nipple adapted to fit into and seal the opening in said mouth set.

13. A controllable doll voice comprising a casing closed at one end by a sound discharge cap and closed at the other end by a closure cap having a vent opening, a flexible bellows in said casing, means to move the same, and optionally usable control means to seal the aforesaid vent opening.

14. A controllable doll voice comprising a casing closed at one end by a sound discharge cap and closed at the other end by a closure, a vent opening in said casing, a weighty head movable in said casing, a flexible bellows secured at one end to said weighty head and secured at the other end to said casing, and control means to seal the aforesaid vent opening in order to inhibit movement of the bellows.

15. A controllable doll voice comprising a casing closed at one end by a sound discharge cap having secured thereto a sound producing element and closed at the other end by a closure having a vent opening, a weighty head movable in said casing, a flexible bellows secured at one end to said weighty head and secured at the other end to said casing, and control means to seal the aforesaid vent opening in order to inhibit movement of the bellows.

16. A controllable doll voice comprising a casing closed at one end by a sound discharge cap having secured thereto a sound producing element and closed at the other end by a closure having a vent opening, a weighty head movable in said casing, a flexible frustroconical bellows secured at one end to said weighty head and secured at the other end to said sound discharge cap, and control means to seal the aforesaid vent opening in order to seal the casing around the bellows and thereby inhibit movement of the bellows.

17. A controllable doll voice comprising a casing closed at one end by a sound discharge cap and closed at the other end by a closure having a vent opening, a flexible bellows in said casing, means to move the same, a mouth set having an opening, a flexible tube connected between the mouth set opening and the vent opening of the voice casing, and control means to seal the mouth opening.

18. A controllable doll voice comprising a cylindrical casing closed at one end by a sound discharge cap having secured thereto a sound producing element and closed at the other end by a closure having a vent opening, a weighty head movable in said casing, a flexible bellows secured at one end to said weighty head and secured at the other end to said casing, a mouth set having an opening, a flexible tube connected between the mouth set opening and the vent opening of the voice casing, and means adapted to be inserted in and to seal the mouth opening in order to inhibit movement of the bellows.

19. A controllable doll voice comprising a cylindrical casing closed at one end by a sound discharge cap having secured thereto a sound producing element and closed at the other end by a closure having a vent opening, a weighty head movable in said casing, a flexible frustro-conical bellows secured at one end to said weighty head and secured at the other end to said sound discharge cap, a mouth set having an opening, a flexible tube connected between the mouth set opening and the vent opening of the voice casing, and a nipple adapted to be inserted in and to seal the mouth opening in order to seal the casing around the bellows and thereby inhibit movement of the bellows.

20. A doll comprising a body having a sound discharge opening, a head movably mounted thereon and having a mouth opening, a doll voice mounted in said body at said sound discharge opening, said voice including a casing, a weighty head movable therein, a flexible bellows having a part connected to said head, and sound producing means, flexible means connected between the mouth opening and the voice casing, and a simulated nipple adapted to be inserted in the mouth opening in order to control the operability of the voice through said flexible means.

21. A doll comprising a body having a sound discharge opening, a head movably mounted thereon and having a mouth opening, a doll voice mounted in said body at said sound discharge opening, said voice including a casing, a flexible bellows therein, means to move the same, and sound producing means, a flexible tube connected between the mouth opening and the voice casing, and means at the mouth set opening to open or close the tube.

22. A doll comprising a body having a sound discharge opening, a head movably mounted thereon and having a mouth opening, a doll voice mounted in said body at said sound discharge opening, said voice including a casing, a weighty head movable therein, a flexible bellows having a part connected to said head, and sound producing means, a mouth set secured in the head at said mouth opening, a flexible tube connected between the mouth set opening and the voice casing, and means at the mouth set opening to open or close the tube.

23. A doll comprising a body having a sound discharge opening, a head movably mounted thereon and having a mouth opening, a doll voice mounted in said body at said sound discharge opening, said voice including a casing, a weighty head movable therein, a flexible bellows having a part connected to said head, and sound producing means, a mouth set secured in the head at said mouth opening, a flexible tube connected between the mouth set opening and the voice casing, and a simulated nipple adapted to be inserted in and to seal the mouth set opening in order to control the operability of the voice.

OTTO E. DENIVELLE.
JOHN H. WILHELM.